(12) United States Patent
Yadav et al.

(10) Patent No.: US 11,539,538 B1
(45) Date of Patent: Dec. 27, 2022

(54) SYSTEM AND MECHANISM TO REPORT USAGE FOR OFFLINE SERVICES WITH SPECIFIC TRIGGER REQUIREMENTS

(71) Applicant: Cisco Technology, Inc., San Jose, CA (US)

(72) Inventors: Mukesh Yadav, Bangalore (IN); Ravi Shankar Mantha, Bangalore (IN); Sandeep Dasgupta, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/383,990

(22) Filed: Jul. 23, 2021

(51) Int. Cl.
    *H04L 67/14*   (2022.01)
    *H04L 12/14*   (2006.01)

(52) U.S. Cl.
    CPC ...... *H04L 12/1407* (2013.01); *H04L 12/1432* (2013.01); *H04L 67/14* (2013.01)

(58) Field of Classification Search
    CPC . H04L 12/1407; H04L 12/1432; H04L 67/14; H04L 65/1066; H04L 12/1435; H04L 12/24; H04L 12/26
    See application file for complete search history.

(56) References Cited

U.S. PATENT DOCUMENTS

| | | | |
|---|---|---|---|
| 10,448,268 B1* | 10/2019 | Jaya | H04W 76/19 |
| 10,681,222 B2 | 6/2020 | Yan et al. | |
| 11,019,531 B2 | 5/2021 | Nithiyanantham et al. | |
| 2019/0253917 A1* | 8/2019 | Dao | H04W 28/0268 |
| 2020/0120214 A1* | 4/2020 | Yan | H04L 12/1407 |
| 2020/0145876 A1* | 5/2020 | Dao | H04W 80/10 |
| 2020/0336321 A1 | 10/2020 | Ding | |
| 2021/0136235 A1 | 5/2021 | Yang et al. | |

FOREIGN PATENT DOCUMENTS

| | | | | |
|---|---|---|---|---|
| WO | WO-2019042214 A1 * | 3/2019 | | H04W 36/00 |
| WO | 2020001795 | 1/2020 | | |

* cited by examiner

*Primary Examiner* — Mewale A Ambaye
(74) *Attorney, Agent, or Firm* — Polsinelli

(57) ABSTRACT

Systems and methods are provided for utilizing an asynchronous report feature when a time or volume reporting trigger is unavailable. The systems and method can include receiving node level capabilities from at least one of a plurality of user plane functions, receiving an asynchronous report from the at least one of the plurality of user plane functions, determining an absence of a reporting trigger based on charging information associated with a policy control function and trigger information associated with a charging function, selecting a user plane function from the plurality of user plane functions based on the asynchronous report, and generating a usage reporting rule without the reporting trigger to be provided to the user plane function from the plurality of user plane functions.

20 Claims, 9 Drawing Sheets

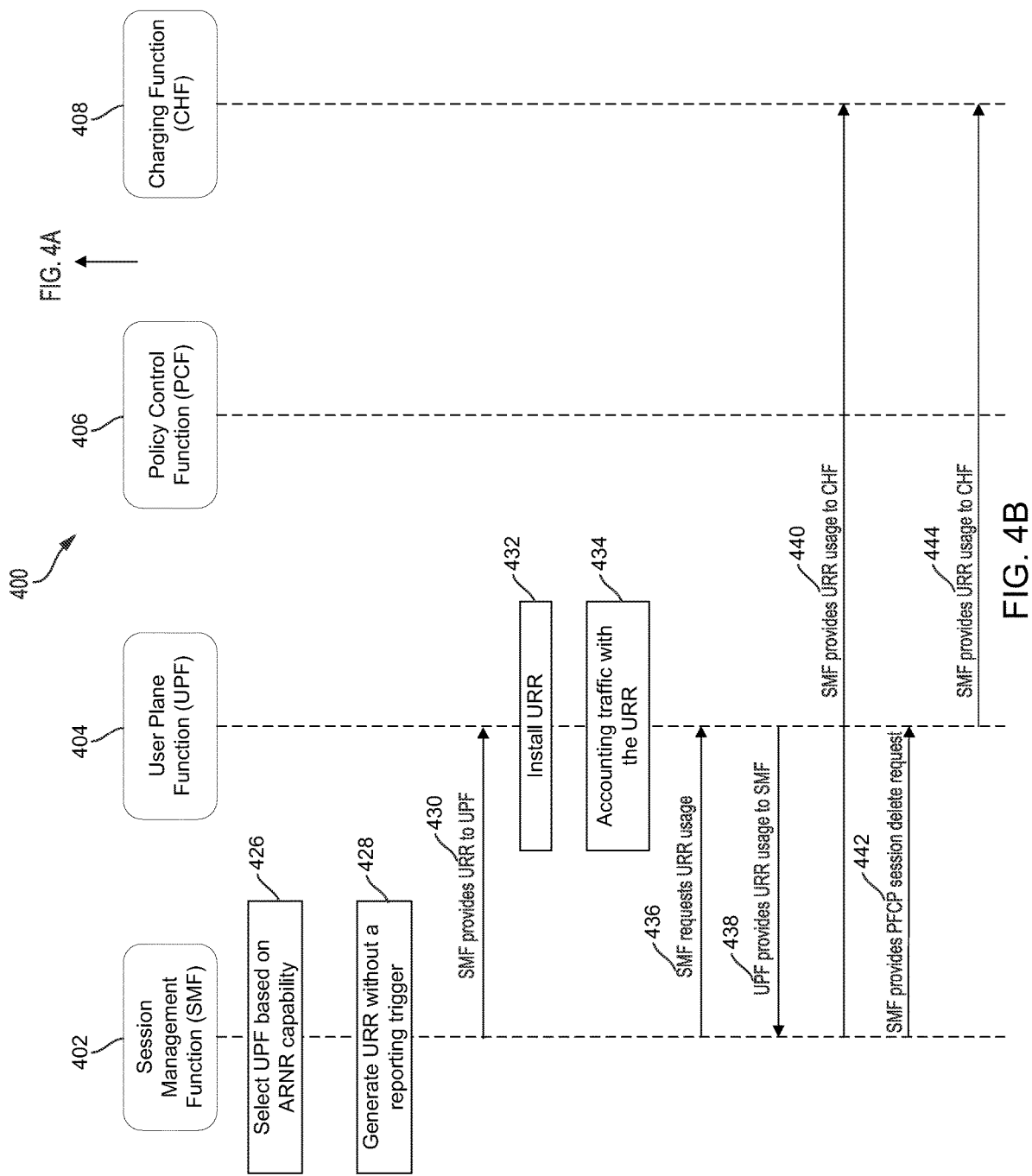

US 11,539,538 B1

SYSTEM AND MECHANISM TO REPORT USAGE FOR OFFLINE SERVICES WITH SPECIFIC TRIGGER REQUIREMENTS

TECHNICAL FIELD

The subject matter of this disclosure relates in general to the field of wireless communication, and more particularly, to utilizing an AsynchronousReportNotRequired ("ARNR") feature when a time or volume reporting trigger is unavailable.

BACKGROUND

Wireless communications systems are deployed to provide various telecommunications and data services, including telephony, video, data, messaging, and broadcasts. A fifth-generation (5G) mobile standard calls for higher data transfer speeds, greater number of connections, and better coverage, among other improvements. The advantages offered by a 5G network can be leveraged by private industries that are driving the deployment of private networks, which may also be referred to as Standalone Non-public Networks (SNPNs) or Public Network Integrated Non-Public Networks (PNI-NPNs).

In some cases, a wireless device can be configured to operate on multiple wireless networks. For example, a wireless device can be configured to operate on a private network (e.g., an NPN) as well as a public network that is operated by a mobile network operator (MNO). In some examples, the wireless device may be configured to use different network identities that are associated with the different wireless networks. A wireless network can use the network identity associated with a wireless device to provide short message service (SMS) (e.g., text messages) to the wireless device.

BRIEF DESCRIPTION OF THE FIGURES

To provide a more complete understanding of the present disclosure and features and advantages thereof, reference is made to the following description, taken in conjunction with the accompanying drawings, in which:

FIGS. 4A and 4B illustrate an example sequence diagram of a process for a Control and User Plane Separation network architecture, in accordance with some embodiments;

DESCRIPTION OF EXAMPLE EMBODIMENTS

Figure 1A:
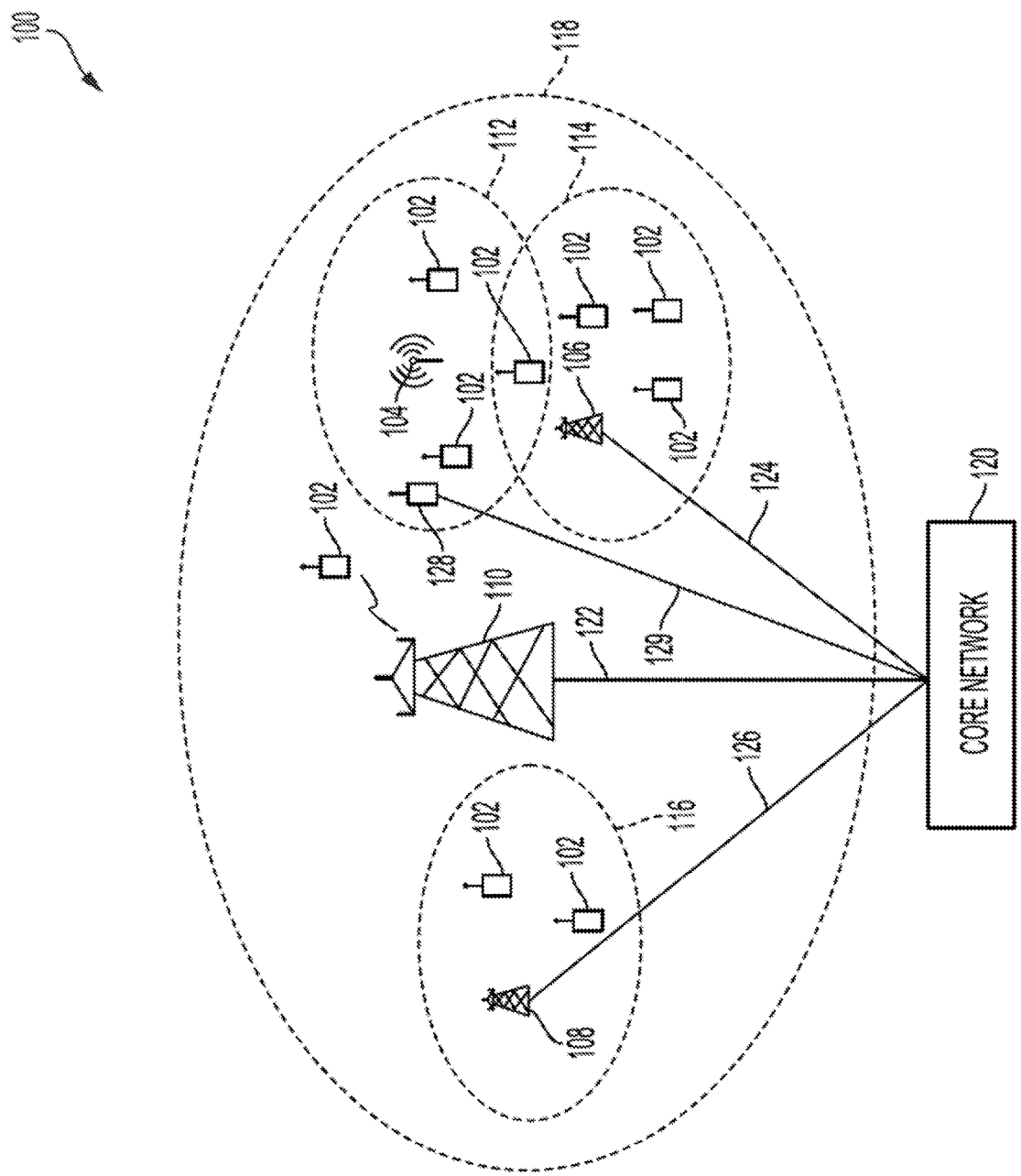
FIG. 1A illustrates an example network architecture, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for utilizing an AsynchronousReportNotRequired ("ARNR") feature when a time or volume reporting trigger is unavailable. For example, the systems and method can include receiving node level capabilities from at least one of a plurality of user plane functions, receiving an asynchronous report (e.g., ARNR information) from the at least one of the plurality of user plane functions, determining an absence of a reporting trigger based on charging information associated with a policy control function and trigger information associated with a charging function, selecting a user plane function from the plurality of user plane functions based on the asynchronous report, and generating a usage reporting rule without the reporting trigger to be provided to the user plane function from the plurality of user plane functions.

EXAMPLE EMBODIMENTS

A wireless device can include devices such as a mobile phone, router, tablet computer, laptop computer, consumer asset tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a wireless device can be referred to as user equipment (UE), such as when referring to a wireless device configured to communicate using 5G/New Radio (NR) or other telecommunications standard.

In some cases, a wireless device be configured to operate on a private network as well as a public network (e.g., a network operated by a mobile network operator (MNO)). For example, the wireless device can have different network identities that can be used to associate with each corresponding network. Messages (e.g., SMS messages) that are directed to the wireless device using one of its network identities may be lost or delayed if the wireless device is not registered to the corresponding network. For example, if a message is sent to the network identity that the wireless device uses to associate with a private enterprise network, the message will not be delivered if the wireless device is registered to a public network (e.g., the message cannot be delivered because the device is not connected to the private network). Similarly, if a message is sent to the network identity that the wireless device uses to associate with a public network, the message will not be delivered if the wireless device is registered to a private network (e.g., the message cannot be delivered because the device is not connected to the public network).

Figure 1B:
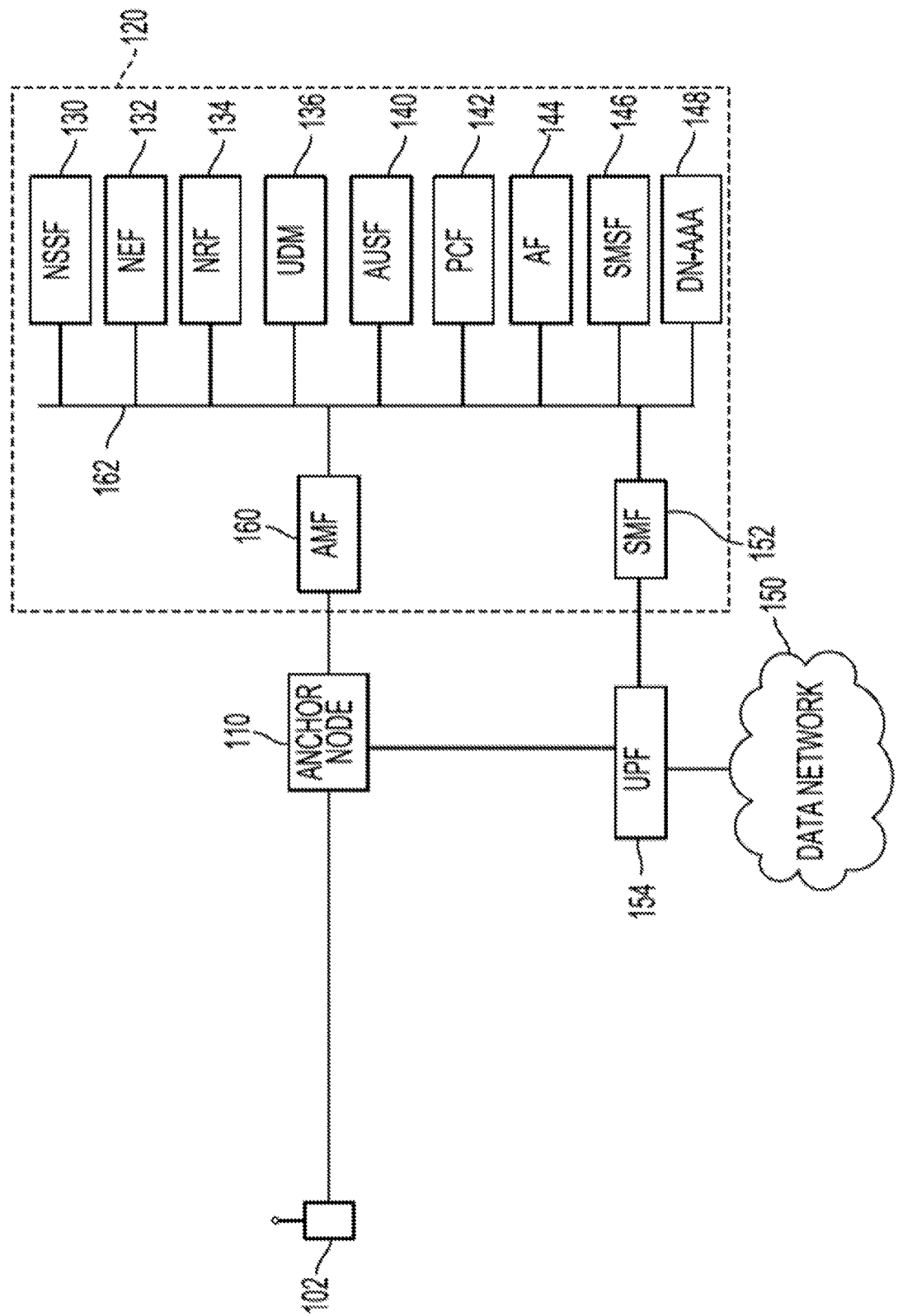
FIG. 1B illustrates an example network architecture, in accordance with an embodiment of the present disclosure.

FIGS. 1A and 1B illustrate an example of network architecture and associated components, according to an aspect of the present disclosure. As shown in FIG. 1A, network 100 is a 5G wireless communication network. Network 100 can include a number of user equipment (UE) 102. UEs 102 can be any type of known or to be developed device capable of establishing communication over a wireless/radio access technology with other devices. Examples of UEs 102 include, but are not limited to, various types of known or to be developed smart phones, laptops, tablets, desktop computers, Internet of Things (IoT) devices, etc.

UEs 102 can have multiple different radio access technology (RAT) interfaces to establish a wireless communication session with one or more different types of base stations (nodes) that operate using different RATs with network 100. For example, a UE 102 can have a 5G interface as well as a 4G interface. Therefore, such UE 102 can be, from time to time and as the need may arise, be handed over from a 5G network to a neighboring 4G network and vice-versa.

Network 100 may also include nodes 104, 106, 108 and 110. Nodes 104, 106, 108 and 110 can also be referred to as base stations or access points 104, 106, 108 and 110. For example, node 104 can be a WiFi router or access point providing a small cell site or coverage area 112 for several of the UEs 102 therein. Therefore, node 104 may be referred to as a small cell node. Nodes 106 and 108 can be any one of various types of known or to be developed base stations providing one or more different types of Radio Access Networks (RANs) to devices connecting thereto. Examples of different RANs include, but are not limited to, Global System for Mobile Communication (GSM), General Packet Radio Service (GPRS)/Enhanced Data Rates for GSM Evolution (EDGE), Universal Mobile Telecommunications System (UMTS), Long-Term Evolution (LTE), LTE-advanced, Worldwide Interoperability for Microwave Access (WiMAX), WiFi, Code Division Multiple Access (CDMA), Evolution-Data Optimized (EV-DO), IS-95 etc.

Node 106 can provide coverage area 114 for end points 102 within coverage area 114. As shown in FIG. 1A, one or more UEs 102 can be located on an overlapping portion of coverage areas 112 and 114. Therefore, such one or more UEs 102 can communicate with node 104 or node 106.

Furthermore, node 108 can provide coverage area 116 for some of UEs 102 in coverage area 116. Node 110 can provide coverage area 118 for all UEs 102 shown in FIG. 1A.

Within the 5G structure of network 100, nodes 104, 106, 108 and 110 may operate in a connected manner to expand the coverage area provide by node 110 and/or to serve more UEs 102 than node 110 or some of the nodes 104, 106, 108 and 110 can handle individually. Node 104 may be communicatively coupled to node 106, which may in turn be communicatively coupled to node 110. Similarly, node 108 can be communicatively coupled to node 106 and/or node 110. Node 104 and node 106 can communicate with node 110 via any known or to be developed wireless communication standard. Also, node 108 can communicate with node 110 via any known or to be developed wireless communication standard.

Within network 100, node 110 can have a wired connection to core network 120 via, for example, fiber optics cables. This may be referred to as backhaul 122 or backhaul connection 122. While fiber optic cables are an example of a connection medium for backhaul 122, the present disclosure is not limited thereto and the wired connection can be any other type of know or to be developed wire.

Furthermore, each of nodes 106, 108 and 110 can include any type of base station such as a next generation or 5G e-NodeB, which may also be referred to a global NodeB (gNB). Each of nodes 106 and 108 can have separate backhaul connections 124 and 126 to core network 120. Connections 124 and 126 can be the same as backhaul connection 122. In an example, where node 104 is a WiFi node, node 104 can connect to Core network 122 via a node 128, which can be a N3 Interworking Function (N3IWF) node. Connection 129 between node 128 and Core network 120 can be the same as backhaul connection 122.

FIG. 1B illustrates another example architecture with components of core network 120 of FIG. 1A, according to an aspect of the present disclosure. A simplified version of network 100 is shown in FIG. 1B, where a single UE 102 has a wireless communication session established with base station 110. Base station 110 is in turn connected to core network 120 via backhaul 122.

Furthermore, FIG. 1B illustrates example logical components of core network 120. Example components/nodes of core network 120 include various network functions implemented via one or more dedicated and/or distributed servers (can be cloud based). Core network 120 of 5G network 100 can be highly flexible, modular and scalable. It can include many functions including network slicing. It offers distributed cloud-based functionalities, Network functions virtualization (NFV) and Software Defined Networking (SDN).

For example, core network 120 can include Application and Mobility Management Function (AMF) 160, with which base station 110 communicates (e.g., using an N2 interface). Core network 120 further has a bus 162 connecting various servers providing different example functionalities. For example, bus 162 can connect AMF 160 to Network Slice Selection Function (NSSF) 130, Network Exposure Function (NEF) 132, Network Repository Function (NRF) 134, Unified Data Management (UDM) 136, Authentication Server Function (AUSF) 140, Policy Control Function (PCF) 142, Application Function (AF) 144, Short Message Service Function (SMSF) 146, Data Network Authentication, Authorization, and Accounting (DN-AAA) 148 function/server, and Session Management Function (SMF) 152. In some aspects, one or more of the functions or components illustrated may be outside of core network 120 (e.g., DN-AAA 148 can be outside core network 120).

In one example, a node serving as SMF 152 may also function as a control plane Packet Gateway (PGW-C) node. Various components of core network 120, examples of which are described above, provide known or to be developed functionalities for operation of 5G networks including, but not limited to, device registration, attachment and authentication, implementing network policies, billing policies, etc.

Furthermore, as shown in FIG. 1B, SMF 152 is connected to User Plane Function (UPF) 154, which in turns connects core network 120 and/or UE 102 (after authentication and registration with core network 120) to data network (DN) 150. In one example, a node serving as UPF 154 may also function as a user plane Packet Gateway (PGW-C) node and/or a user place Serving Gateway (SGW-U) node.

While FIG. 1B illustrates an example structure and components of core network 120, the present disclosure is not limited thereto. Core network 120 can include any other number of known or to be developed logical functions and components and/or can have other known or to be developed architecture.

For purposes of illustration and discussion, network 100 has been described with reference to a limited number of UEs 102, nodes 104, 106, 108, 110, etc. However, inventive concepts are not limited thereto.

Furthermore, while certain components have been illustrated and described with reference to FIGS. 1A and 1B, network 100 can include any other known or to be developed elements or components for its operation.

In Control Plane and User Plane Separation ("CUPS") architecture, traffic handling and usage counting can occur at user plane function (UPF), and usage can be relayed to a session management function (SMF) by the UPF pursuant to usage reporting rules (URR). The URR usage can also be relayed by the SMF to a charging function ("CHF"). The SMF can initially generate URRs and associate them with a packet detection rule (PDR). Traffic can then be processed under the PDR and its usage accounted for via the URR at the UPF.

The URR can also be generated by the SMF and provided to the UPF with time and/or volume limits and reporting triggers. Using reporting triggers, the SMF arms the UPF as to when to report usage (e.g., when volume/time thresholds are breached, etc.) This is an asynchronous way of the UPF to report usage when some of the armed triggers at the UPF are reached.

The SMF can report the usage from the UPF using a reporting mechanism. This can occur when a chargeable event is armed by the CHF, which may occur at the SMF (e.g., a RAT_CHANGE, PLMN_CHANGE, etc.). However, this event cannot be detected by the UPF. As such, only those events that occur at the SMF (e.g., those that the SMF queries with respective URRs) receive usage information, which are then reported to the CHF (e.g., a charging server).

This is a limitation in current protocol (e.g., packet forwarding control protocol (PFCP) protocol on an N4 interface (5G) and similarly in a 4G CUPS system, in generating a URR. Another limitation is that limits may not be available at the SMF, which can be a local configuration or provided by the CHF. For example, the SMF will not arm a trigger such as volume and time. Also, if there is no trigger that the SMF can arm or if there is no trigger that needs to be armed, then the SMF has no way of generating a URR. This is because in order to generate a URR there has to be a reporting trigger, which may be a mandatory information element (IE) and reporting trigger, which is set if there are many reporting triggers. For example, at least one trigger may be set to "true."

In one example, the PCF can install a ChargingDesc when an operator wants to charge a rating group/service ID and its method is offline charging. However, the operator does not want an asynchronous report. As such, the operator will not configure any limits for the rating group locally at the SMF or from the CHF for the rating group. In this example, the operator will not want any asynchronous report from the UPF (e.g., volume/time limits), but may still want a report of the following: a CC event such as RAT_Change that occurs at the SMF or a CUPS-C 4G such as packet gateway ("PGW")/serving gateway ("SGW"), URR deletion, and call deletion. Since generating a URR in the above-provided example is not possible, the above-mentioned example is not possible. In one example, if the SMF goes ahead and creates a URR without a reporting trigger, the UPF will reject the request, which will impact calls.

As such, a need exists to generate a URR when a reporting trigger or limits are unavailable. For example, by providing a "control knob" that can select a UPF that is capable of handling a URR without a report trigger. The above-referenced limitation hampers usage reporting for charging services that may be needed, which may lead to overloading the network on the N4 or N40 interfaces, and require additional CPU processing on nodes such as the UPF, SMF, and CHF. For example, in a short audio call, no limit based reporting can be expected, but end usage may be needed. Another example, in a long serving session where no limits based reporting may be expected or needed, but usage in the above-mentioned examples may be needed.

The present technology provides systems and method can include receiving node level capabilities from at least one of a plurality of user plane functions, receiving ARNR information from the at least one of the plurality of user plane functions, determining an absence of a reporting trigger based on the node level capabilities and the ARNR information, selecting a user plane function from the plurality of user plane functions based on the ARNR information, and generating a usage reporting rule without the reporting trigger to be provided to the user plane function from the plurality of user plane functions.

As further described below, the disclosed technology provides systems, methods, and computer-readable media for utilizing an AsynchronousReportNotRequired ("ARNR") feature when a time or volume reporting trigger is unavailable. Examples will be described herein using 5G/New Radio (NR) as an illustrative example. However, the systems and techniques are not limited to 5G and can be implemented using other wireless technologies such as next generation 6G networks and 4G Control and User Plane Separation (CUPS) architecture between SGWC-U and PGWC-U, as described herein. The present technology will be described in the subsequent disclosure as follows.

Figure 2:
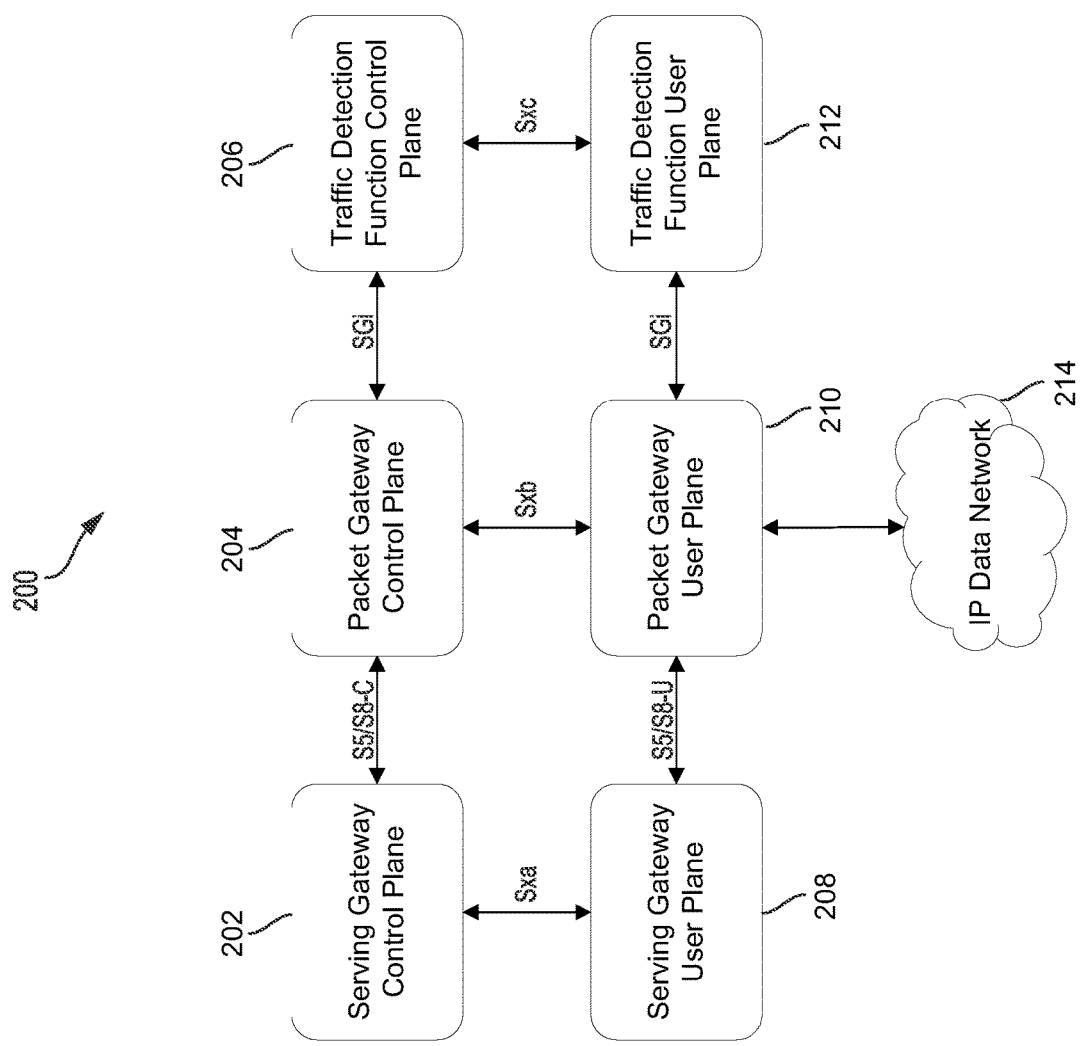
FIG. 2 illustrates an example Control and User Plane Separation network architecture, in accordance with some embodiments.

FIG. 2 illustrates an example Control and User Plane Separation (CUPS) network architecture 200, in accordance with some embodiments. The CUPS network architecture 200 can include a serving gateway control plane ("SGW-C") 202, a packet gateway control plane ("PGW-C") 204, a traffic detection function control plane ("TDF-C") 206, a serving gateway user plane ("SGW-U") 208, a packet gateway user plane ("PGW-U") 210, a traffic detection function user plane ("TDF-U") 212, and an IP data network 214.

The CUPS network architecture 200 can allow mobile operators to separate the control plane and user plane of their network (e.g., Evolved Packet Core (EPC)). This capability can deliver the ability to scale each network plane independent of one another, promoting a more cost-effective approach to core mobile architecture, and future-proofing the network for 5G. With CUPS for ultra services platform (USP), an existing serving gateway ("SGW"), packet gateway ("PGW"), and serving architecture evolution gateway ("SAEGW") can be separated into SGW-C, PGW-C, and SAEGW-C for the control plane and SGW-U, PGW-U, and SAE-GWU for the user plane. The CUPS network architecture 200 can include features such as: independent scalability of the control and user planes; ability to specialize the user plane for key applications; 5G readiness; lower backhaul costs; traffic offload; new use-case enablement; and multi-level CUPS offerings.

In some implementations, the CUPS network architecture 200 can include various interfaces that connect the control planes and the user planes. For example, the SGW-C 202 can be connected to the PGW-C 204 via an S5/S8-C interface. The PGW-C 204 can be connected to the TDF-C 206 via an SGi interface. The TDF-C 206 can be connected to the TDF-U 212 via an Sxc interface. The TDF-U 212 can be connected to the PGW-U 210 via an SGi interface. The PGW-U 210 can be connected to the SGW-U 208 via an S5/S8-U interface, the PGW-U 210 can be connected to the PGW-C 204 via an Sxb interface, and the SGW-U 208 can be connected to the SGW-C 202 via an Sxa interface.

Figure 3:
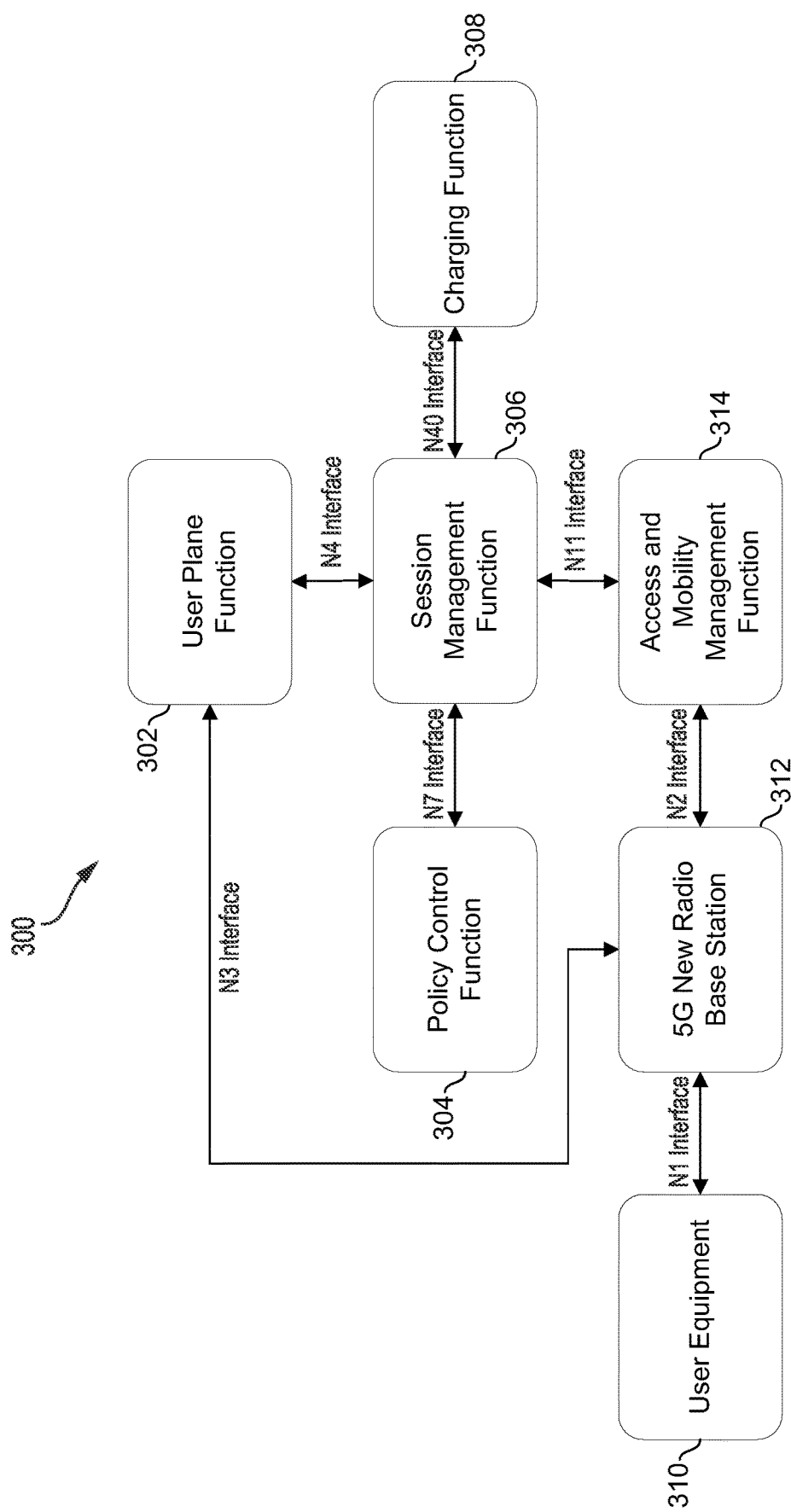
FIG. 3 illustrates an example Control and User Plane Separation network architecture, in accordance with some embodiments.

FIG. 3 illustrates an example Control and User Plane Separation (CUPS) network architecture 300, in accordance with some embodiments. The CUPS network architecture 300 can include a user plane function (UPF) 302, a policy control function (PCF) 304, a session management function (SMF) 306, a charging function ("CHF") 308, a user equipment (UE) 310, a 5G new radio base station ("gNB") 312, and an access and mobility management function ("AMF") 314.

In some implementations, The UPF 302 can be connected to the SMF 306 via an N4 interface. The PCF 304 can be connected to the SMF 306 via an N7 interface. The SMF 306 can be connected to the CHF 308 via an N40 interface. The SMF 306 can be connected to the AMF 314 via an N11 interface. The AMF 314 can be connected to the gNB 312 via an N2 interface. The gNB 312 can be connected to the UE 310 via an N1 interface. The UPF 302 can be connected to the gNB 312 via an N3 interface.

In other implementations, the CUPS network architecture 300 can utilize a customized feature. Initially, the CUPS network architecture 300 can include the SMF 306 and the UPF 302 exchanging information regarding existing supported features that may be facilitated by a node level message exchange between the SMF 306 and the UPF 302. The node level messages can include information relating to information elements (IE) such as a control plane (CP) 306 (e.g., the session management function 306) and a user plane (UP) 302 (e.g., the user plane function 302) supported features. For example, the node level messages can include a bit map and node advertisements if the feature is supported by the node. The CUPS network architecture 300 can further include utilizing an AsynchronousReportNotRequired ("ARNR") feature along with CP 306 and UP 302 function features. The CP 306 and UP 302 can also advertise support of the ARNR feature in a node level message exchange.

In some examples, if both of the UP 302 and CP 306 advertise to each other that they support the ARNR feature, the CP 306 understands that if the CP 306 provides a usage reporting rule (URR) (e.g., Create URR) without a reporting trigger, or a reporting trigger without a valid trigger, the UP 302 may not reject the session message request. In another example, when the SMF 306 generates a URR and has no valid reporting triggers, the SMF 306 can continue to generate the URR without a reporting trigger or with a reporting trigger without a valid trigger set, knowing that the UP 302 supports the ARNR feature and that the UP 302 may not reject the session message even if it is uninformed, which may be mandated by a reporting trigger.

The ARNR feature can be an enhanced CP 306/UP 302 supported feature information element. For example, an extra bit can be set for the ARNR feature as shown below in Table 1. The ARNR feature can have an octet value of "10" and a bit value of "2." The ARNR feature can further utilize various interfaces such as Sxa, Sxb, Sxc (as shown in FIG. 2), and N4 (as shown in FIG. 3). In Table 1, the Feature Octet/Bit: can be the octet and bit number within the supported-features IE, e.g., "5/1;" Feature: can be a short name that can be used to refer to the octet/bit and to the feature; Interface: can be a list of applicable interfaces to the feature; and Description: can be a textual description of the feature.

In some implementations, information relating to the ARNR feature can be communicated between the SMF 306 and the UPF 302. The ARNR feature can also be capable of including a reporting trigger IE on a PFCP interface and work with UP 302 nodes. UE 310 subscription to non-asynchronous triggers can be provisioned in unified data management (UDM) so that the SMF 306 can override local configurations or asynchronous triggers provided by the CHF 308.

The CUPS network architecture 300 can provide an operator with control to achieve charging services for offline when there is no time or volume reporting that is required. In absence of this, if the operator wants usage information in a CC event, a URR Deletion, or Call Deletion, the operator would have to provide a mandatory configuration with volume/time limits. The CUPS network architecture 300 provides the added benefit where an operator is not interested in receiving timely reports, but rather, is expected to receive a report when a charging event occurs, when a charging service is removed, or when a call is deleted. The CUPS network architecture 300 can lower congestion and CPU overhead.

A UPF may need a URR (e.g., per rating group (RG)/svcID bucket) to count for RG/svcid usage. Previous configurations may not allow generation of an offline URR without a volume or time threshold trigger for periodic reporting. There would be many instances where an operator is not interested in periodic volume or time based reporting, but rather, the operator would like to receive usage data per RAT type or location. For example, short audio calls such as calls to an automated helpline, etc.; and Internet-of-Things (IoT) devices such as connected cars where data volume is not significant but UE mobility and differential charging based on RAT type/PLMN may be needed.

Furthermore, previous configurations may not provide the opportunity to generate a URR at the UPF without a volume/time threshold that may be received from the CHF or locally configured.

In other implementations, the CUPS network architecture 300 may not add a new message or IE at a per session level to increase the traffic/chattiness on the N4 interface. The CUPS network architecture 300 can generate a URR at the UPF 302 without any volume/time thresholds, thereby reducing messages across the N4 interface. In some examples, the UPF 302 may need URR buckets to be generated per RG and service ID. The UPF 302 may not be able to generate a default bucket on its own without the SMF 306 on the N4 interface since RG and service ID may not be known to the UPF 302, which is known by the SMF 306 and the CHF 308.

Generating a default (e.g., very large) volume limit may be problematic for the following reasons: 1) an SMF may need to have multiple different default volume threshold configurations for high speed UEs and regular UEs, as the high speed UEs may cross a given limit much sooner that may lead to unnecessary usage reporting; and 2) even if a maximum possible value is assigned as a volume threshold for all cases, it may instigate an unnecessary performance impact on the UPF. For every data packet that is received on the UPF for a session, if a volume threshold is activated, the UPF may need to perform checks to see if the data received in a current packet is leading to a volume threshold breach. In this case, a large volume threshold can be added to avoid the problem, but this ends up making the UPF perform unnecessary processing for every data packet.

Moreover, only the volume and time threshold triggers may not be present. The CHF may still be interested in knowing the usage per RAT type and/or location. However, without a URR that is generated at the UPF, the SMF may not query for usage when the SMF detects a RAT/location change.

With previous 3GPP provisions, a URR may not be generated for offline usage until there are volume or time thresholds. The CUPS network architecture 300 can provide a mechanism to override that may eliminate this restriction from 3GPP. For example, the ARNR feature (e.g., enhanced IE) can be in a node level message and not a per session message. The ARNR feature can further be compatible for being a negotiating mechanism between the SMF 306 and the UPF 302. In some examples, there may be no configuration needed on either the SMF 306 or the UPF 302 to send this capability (e.g., the ARNR feature). In other examples, if either of the SMF 306 or the UPF 302 do not support the ARNR feature, the bit (e.g., ARNR feature) may be ignored. If the UPF 302 does not support the ARNR feature, the SMF 306 may not use the mechanism (e.g., ARNR feature).

Figure 4A:
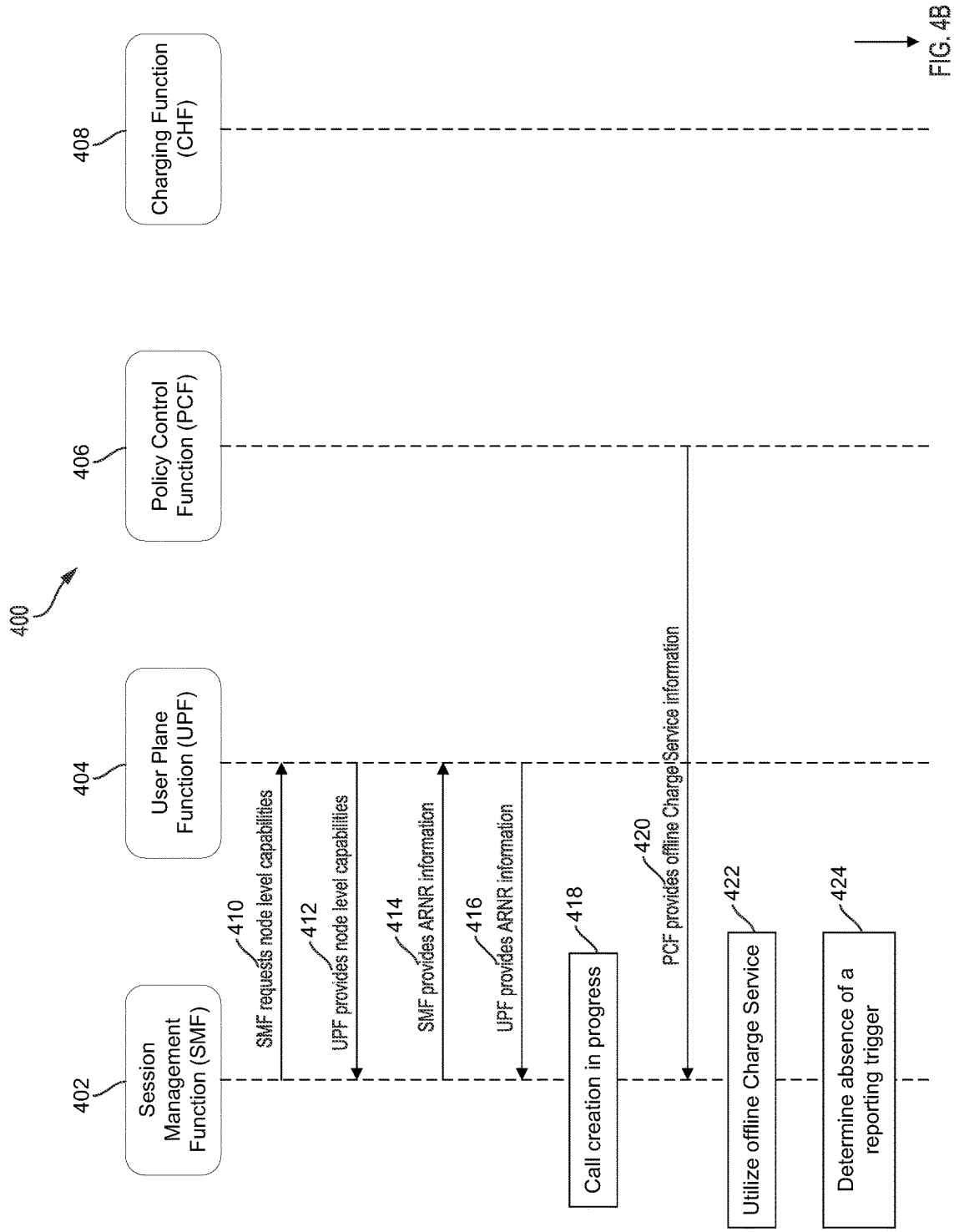

FIGS. 4A and 4B illustrate an example sequence diagram of a process for a Control and User Plane Separation (CUPS) network architecture 400, in accordance with some embodiments. The CUPS network architecture can include a session management function (SMF) 402, a user plane function (UPF) 404, a policy control function (PCF) 406, and a charging function ("CHF") 408.

At step 410, the process 400 can include the SMF 402 providing a request for node level capabilities to the UPF 404. For example, the SMF 402 can publish its capabilities to the UPF 404 when sending a message to the UPF 404.

At step 412, the process 400 can include the UPF 404 providing requested node level capabilities of the UPF 404 to the SMF 402. For example, the UPF 404 can publish its capabilities to the SMF 402 when sending a message to the SMF 402.

At step 414, the process 400 can include the SMF 402 providing a request for AsynchronousReportNotRequired ("ARNR") information to the UPF 404. In some implementations, steps 410, 414 can be combined as a single step where the SMF 402 provides a request for node level capabilities and ARNR information to the UPF 404. An example of the ARNR information is provided below in Table 1:

TABLE 1

AsynchronousReportNotRequired feature.

| Feature Octet/Bit | Feature | Interface | Description |
|---|---|---|---|
| 10/2 | ARNR | Sxa, Sxb, Sxc, N4 | UP support AsynchronousReportNotRequired. |

The ARNR feature can have an octet value of "10" and a bit value of "2." The ARNR feature can further utilize various interfaces such as Sxa, Sxb, Sxc (as shown in FIG. 2), and N4 (as shown in FIG. 3).

At step 416, the process 400 can include the UPF 404 providing requested ARNR information of the UPF 404 to the SMF 402. In some implementations, steps 412, 416 can be combined as a single step where the UPF 404 provides requested node level capabilities and ARNR information of the UPF 404 to the SMF 402.

At step 418, the process 400 can include the SMF 402 generating a call creation in progress.

At step 420, the process 400 can include the PCF 406 providing offline charge service information to the SMF 402.

At step 422, the process 400 can include the SMF 402 utilizing the offline charge service information provided by the PCF 406.

At step 424, the process 400 can include the SMF 402 determining whether there is an absence of a reporting trigger. For example, the SMF 402 can determine whether there is no reporting trigger related to time or volume.

At step 426, the process 400 can include the SMF 402 selecting a UPF from a group of UPFs based on the ARNR capability received from the group of UPFs. For example, UPF selection from the group of UPFs can include utilizing multiple criteria such as data network name (DNN), location, load, etc. The ARNR-based selection can have priority over the above-provided criteria.

At step 428, the process 400 can include the SMF 402 generating a usage reporting rule (URR) without a reporting trigger. For example, the URR can include information as provided in 3GPP spec 29.244, table 7.5.2.4-1.

At step 430, the process 400 can include the SMF 402 providing the generated URR to the UPF 404.

At step 432, the process 400 can include the UPF 404 installing the URR to utilize the embedded instructions.

At step 434, the process 400 can include the UPF 404 accounting for traffic based on the URR received from the SMF 402.

At step 436, the process 400 can include the SMF 402 providing a request for URR usage information from the UPF 404.

At step 438, the process 400 can include the UPF 404 providing URR usage information to the SMF 402.

At step 440, the process 400 can include the SMF 402 providing the URR usage information to the CHF 408.

At step 442, the process 400 can include the SMF 402 providing a packet forwarding control protocol (PFCP) session delete request to the UPF 404.

At step 444, the process 400 can include the UPF 404 providing the URR usage information to the CHF 408.

Figure 5:
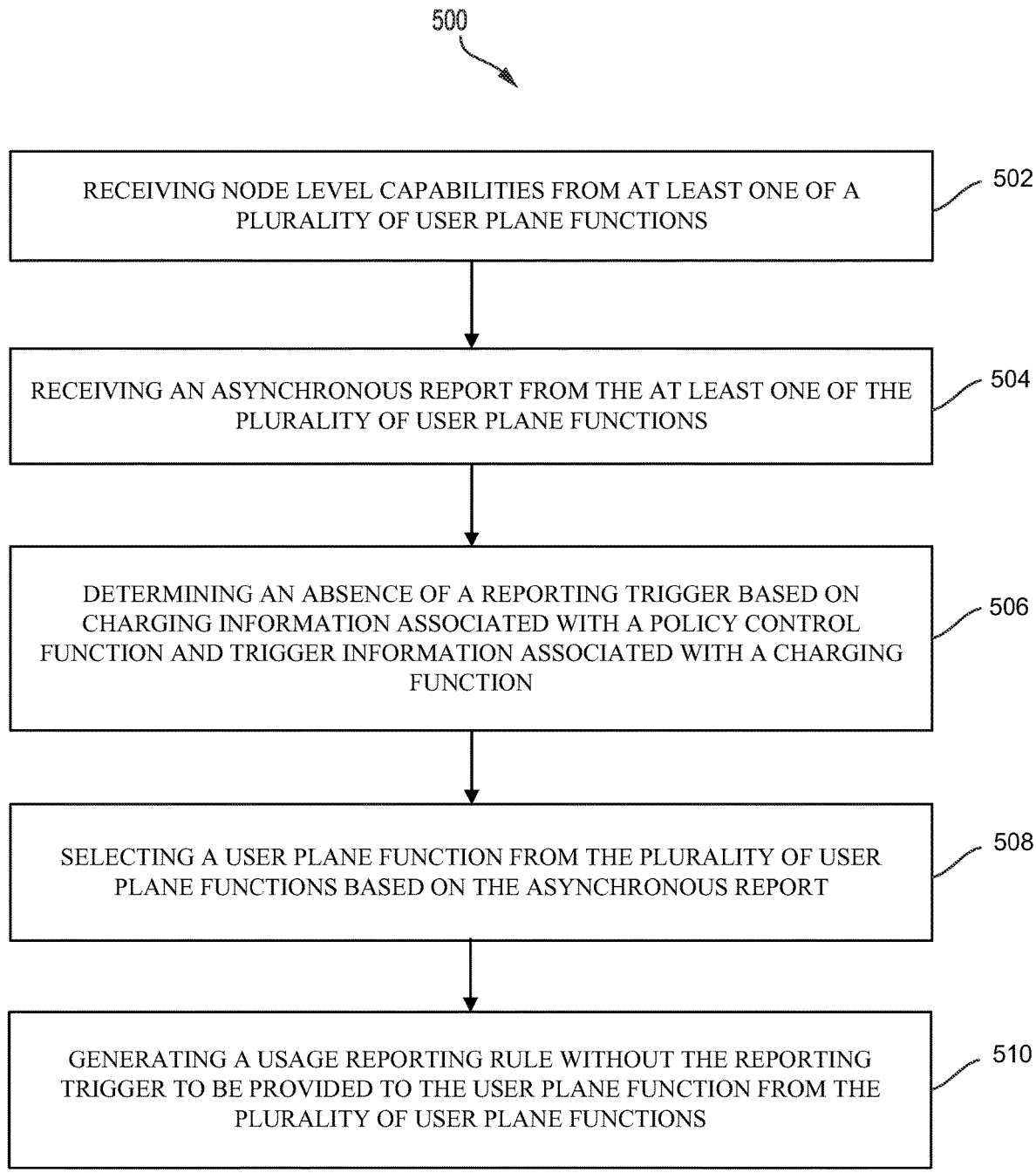
FIG. 5 illustrates an example process for utilizing an AsynchronousReportNotRequired feature when a time or volume reporting trigger is unavailable, in accordance with some embodiments.

Having disclosed some example system components and concepts, the disclosure now turns to FIG. 5, which illustrate example method 500 for utilizing an AsynchronousReportNotRequired ("ARNR") feature when a time or volume reporting trigger is unavailable. The steps outlined herein are exemplary and can be implemented in any combination thereof, including combinations that exclude, add, or modify certain steps.

At step 502, the method 500 can include receiving, at a session management function, node level capabilities from at least one of a plurality of user plane functions.

At step 504, the method 500 can include receiving, at the session management function, an asynchronous report (e.g., AsynchronousReportNotRequired ("ARNR") information) from the at least one of the plurality of user plane functions.

At step 506, the method 500 can include determining, by the session management function, an absence of a reporting trigger based on charging information associated with a policy control function and trigger information associated with a charging function.

At step 508, the method 500 can include selecting, by the session management function, a user plane function from the plurality of user plane functions based on the asynchronous report.

At step 510, the method 500 can include generating, by the session management function, a usage reporting rule without the reporting trigger to be provided to the user plane function from the plurality of user plane functions.

The method 500 can further include receiving offline charge service information from a policy control function. The offline charge service information can exclude limits on volume and time. The determining of the absence of the reporting trigger can also be based on the offline charge service information received from the policy control function.

The method 500 can also include receiving usage reporting rule usage from the user plane function, the usage reporting rule being installed at the user plane function to account for traffic using the usage reporting rule. The method 500 can further include providing the usage reporting rule usage to the charging function. The user plane function only synchronously can provide the usage of the usage reporting rule to the session management function.

Figure 6:
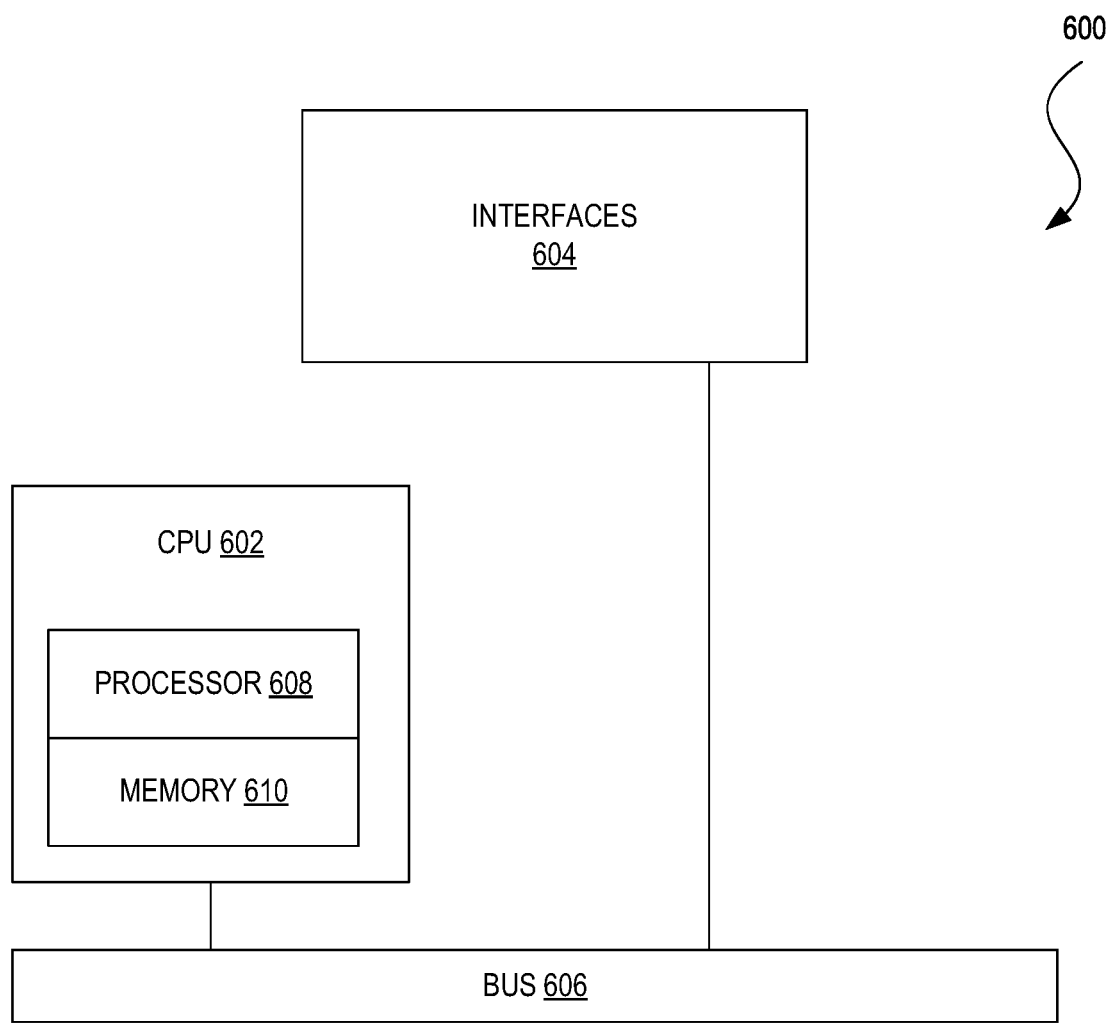
FIG. 6 illustrates an example of a network device, in accordance with some embodiments.

FIG. 6 further illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
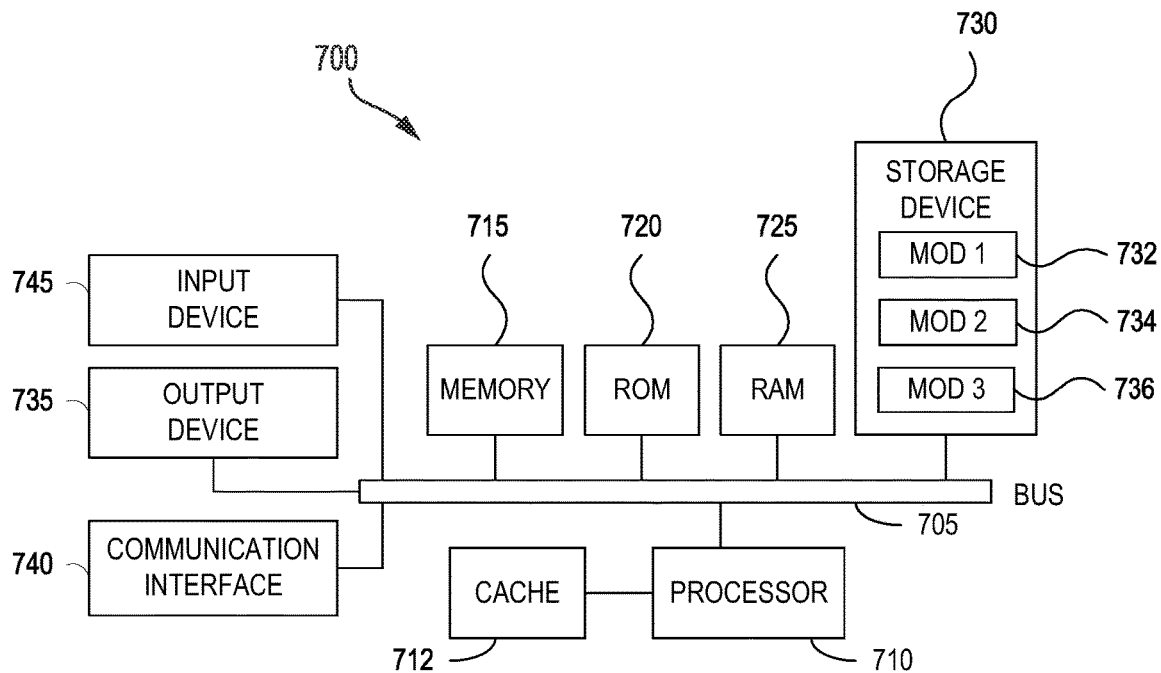
FIGS. 7A and 7B illustrate examples of systems, in accordance with some embodiments.
Figure 7B:
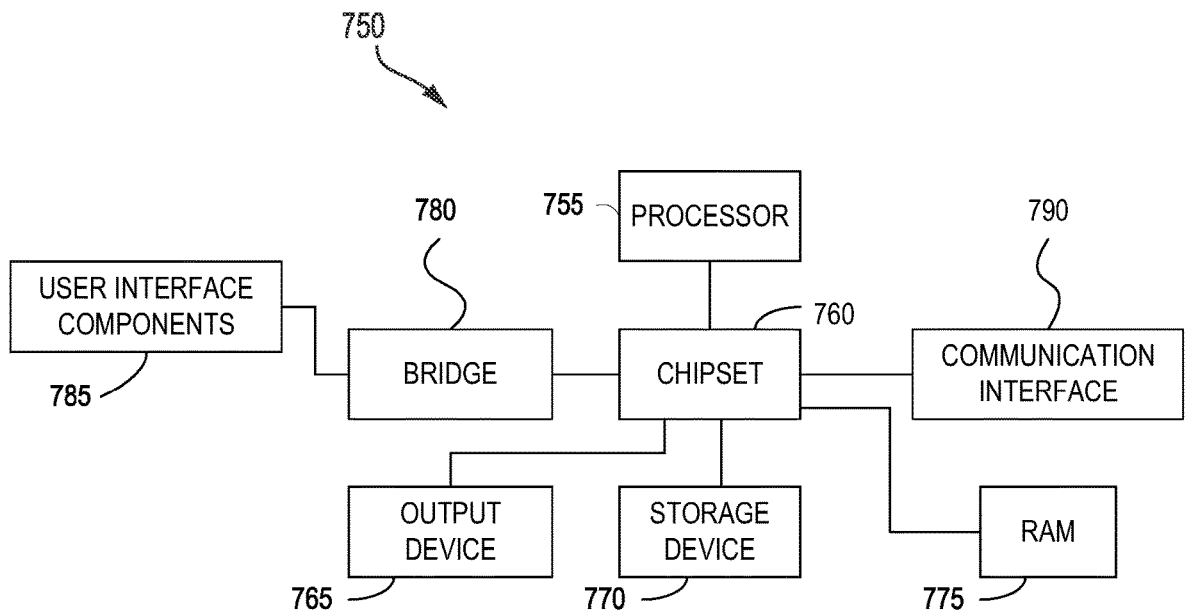

FIGS. 7A and 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a session management function, node level capabilities from at least one of a plurality of user plane functions;
receiving, at the session management function, an asynchronous report from the at least one of the plurality of user plane functions;
determining, by the session management function, an absence of a reporting trigger based on charging information associated with a policy control function and trigger information associated with a charging function;

selecting, by the session management function, a user plane function from the plurality of user plane functions based on the asynchronous report; and generating, by the session management function, a usage reporting rule without the reporting trigger to be provided to the user plane function from the plurality of user plane functions.

2. The computer-implemented method of claim 1, further comprising receiving offline charge service information from the policy control function.

3. The computer-implemented method of claim 2, wherein the offline charge service information excludes limits on volume and time.

4. The computer-implemented method of claim 2, wherein the determining of the absence of the reporting trigger is based on the offline charge service information received from the policy control function.

5. The computer-implemented method of claim 1, further comprising receiving usage reporting rule usage from the user plane function, the usage reporting rule being installed at the user plane function to account for traffic using the usage reporting rule.

6. The computer-implemented method of claim 5, further comprising providing the usage reporting rule usage to the charging function.

7. The computer-implemented method of claim 5, wherein the user plane function only synchronously provides the usage of the usage reporting rule to the session management function.

8. A system comprising:
one or more processors; and
at least one computer-readable storage medium having stored therein instructions which, when executed by the one or more processors, cause the system to:
receive node level capabilities from at least one of a plurality of user plane functions;
receive an asynchronous report from the at least one of the plurality of user plane functions;
determine an absence of a reporting trigger based on charging information associated with a policy control function and trigger information associated with a charging function;
select a user plane function from the plurality of user plane functions based on the asynchronous report; and
generate a usage reporting rule without the reporting trigger to be provided to the user plane function from the plurality of user plane functions.

9. The system of claim 8, wherein the instructions which, when executed by the one or more processors, cause the system to receive offline charge service information from the policy control function.

10. The system of claim 9, wherein the offline charge service information excludes limits on volume and time.

11. The system of claim 9, wherein the determination of the absence of the reporting trigger is based on the offline charge service information received from the policy control function.

12. The system of claim 8, wherein the instructions which, when executed by the one or more processors, cause the system to receive usage reporting rule usage from the user plane function, the usage reporting rule being installed at the user plane function to account for traffic using the usage reporting rule.

13. The system of claim 12, wherein the instructions which, when executed by the one or more processors, cause the system to provide the usage reporting rule usage to the charging function.

14. The system of claim 12, wherein the user plane function only synchronously provides the usage of the usage reporting rule to a session management function.

15. A non-transitory computer-readable storage medium comprising:
instructions stored on the non-transitory computer-readable storage medium, the instructions, when executed by one or more processors, cause the one or more processors to:
receive node level capabilities from at least one of a plurality of user plane functions;
receive an asynchronous report from the at least one of the plurality of user plane functions;
determine an absence of a reporting trigger based on charging information associated with a policy control function and trigger information associated with a charging function;
select a user plane function from the plurality of user plane functions based on the asynchronous report; and
generate a usage reporting rule without the reporting trigger to be provided to the user plane function from the plurality of user plane functions.

16. The non-transitory computer-readable storage medium of claim 15, wherein the instructions, when executed by the one or more processors, cause the one or more processors to receive offline charge service information from the policy control function.

17. The non-transitory computer-readable storage medium of claim 16, wherein the offline charge service information excludes limits on volume and time.

18. The non-transitory computer-readable storage medium of claim 16, wherein the determination of the absence of the reporting trigger is based on the offline charge service information received from the policy control function.

19. The non-transitory computer-readable storage medium of claim 15, wherein the instructions, when executed by the one or more processors, cause the one or more processors to receive usage reporting rule usage from the user plane function, the usage reporting rule being installed at the user plane function to account for traffic using the usage reporting rule.

20. The non-transitory computer-readable storage medium of claim 19, wherein the user plane function only synchronously provides the usage of the usage reporting rule to a session management function.

* * * * *